US012792874B2

(12) United States Patent
Zhao et al.

(10) Patent No.: US 12,792,874 B2
(45) Date of Patent: Nov. 10, 2026

(54) RARE EXAMPLE MINING FOR AUTONOMOUS VEHICLES

(71) Applicant: Waymo LLC, Mountain View, CA (US)

(72) Inventors: Wilson Zhao, Fremont, CA (US); Chiyu Jiang, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 753 days.

(21) Appl. No.: 18/142,437

(22) Filed: May 2, 2023

(65) Prior Publication Data

US 2024/0370695 A1 Nov. 7, 2024

(51) Int. Cl.
*G06N 3/042* (2023.01)
*G07C 5/08* (2006.01)

(52) U.S. Cl.
CPC ........... *G06N 3/042* (2023.01); *G07C 5/0841* (2013.01)

(58) Field of Classification Search
CPC .............................. G06N 3/042; G07C 5/0841
USPC ............................................................ 701/23
See application file for complete search history.

(56) References Cited

U.S. PATENT DOCUMENTS 11,214,268 B2 * 1/2022 Gonzalez Aguirre . G06N 3/088
2011/0052068 A1 * 3/2011 Cobb ................. G06V 10/7715 382/190
2017/0309094 A1 * 10/2017 Farahat ................ G07C 5/0841
2019/0135300 A1 * 5/2019 Gonzalez Aguirre ....................... G06N 3/0464
2019/0259108 A1 * 8/2019 Bongartz ............. G06Q 10/063
2020/0017117 A1 * 1/2020 Milton ...................... G06N 3/09
2020/0184153 A1 * 6/2020 Bongartz ............... A01G 9/249
2021/0312725 A1 * 10/2021 Milton ................... G06N 3/098
2022/0156529 A1 * 5/2022 Kimura ............. G06F 18/24137

(Continued)

FOREIGN PATENT DOCUMENTS

WO WO 2022226434 A1 10/2022

OTHER PUBLICATIONS

Gao et al., "VectorNet: Encoding HD Maps and Agent Dynamics from Vectorized Representation," Proceedings of the IEEE/CVF Conference on Computer Vision and Pattern Recognition, 2020, 11525-11533.

(Continued)

*Primary Examiner* — Yazan A Soofi
(74) *Attorney, Agent, or Firm* — Fish & Richardson P.C.

(57) ABSTRACT

Methods, systems, and apparatus, including computer programs encoded on a computer storage medium, for performing rare example mining in driving log data. In one aspect, a method includes maintaining a plurality of density estimation models that each correspond to a different rareness type with respect to historical sensor inputs in a driving log generated by sensors on-board a vehicle; receiving a query that references a sensor input; generating, from the sensor input, a corresponding density estimation model input for each of the plurality of density estimation models; processing, using each of the plurality of density estimation models, the corresponding density estimation model input to generate a corresponding density score; generating, for the sensor input, and from the density scores, a rareness score associated with each different rareness type; and providing the rareness scores in response to receiving the query.

20 Claims, 10 Drawing Sheets

(56) References Cited

U.S. PATENT DOCUMENTS

| | | | | |
|---|---|---|---|---|
| 2023/0152805 | A1* | 5/2023 | Bramley | G06V 20/56<br>706/15 |
| 2024/0201668 | A1* | 6/2024 | Condessa | G05B 19/4183 |
| 2024/0367685 | A1 | 11/2024 | Zhao et al. | |
| 2024/0403642 | A1* | 12/2024 | Didari | G06N 3/045 |

OTHER PUBLICATIONS

You et al., "Large Batch Optimization for Deep Learning: Training BERT in 76 minutes," CoRR, Submitted on Jan. 3, 2020, arXiv:1904.00962v5, 37 pages.

Zhai et al., "Classification is a Strong Baseline for Deep Metric Learning," Proceedings of the British Machine Vision Conference, Jan. 12, 2019.

Zhang et al., "STINet: Spatio-Temporal-Interactive Network for Pedestrian Detection and Trajectory Prediction," Proceedings of the IEEE/CVF Conference on Computer Vision and Pattern Recognition, 2020, 11346-11355.

H. Chen, H. Ren, R. Li, G. Yang and S. Ma, "Generating Autonomous Driving Test Scenarios based on OpenSCENARIO," 2022 9$^{th}$ International Conference on Dependable Systems and Their Applications (DSA), Wulumuqi, China, 2022 (Year: 2022.

Jiageng Mao, Shaoshuai Shi, Xiaogang Wang, Hongsheng Li, "3D Object Detection for Autonomous Driving: A Comprehensive Survey" arXiv:2206.09474, 2022 (Year: 2022).

Zijian Kuang, Xinran Tie, Lihang Ying, Shi Jin, "Computer Vision and Normalizing Flow-Based Defect Detection" arXiv:2012.06737, 2022 (Year: 2022).

* cited by examiner

RARE EXAMPLE MINING FOR AUTONOMOUS VEHICLES

BACKGROUND

This specification relates to performing rare example mining in driving log data.

For example, driving log data can be used in generating training data for training a machine learning model, e.g., a three-dimensional object detection neural network that is deployed on-board an autonomous vehicle. Three-dimensional object detection neural networks receive input sensor data, e.g., point cloud or camera image data, and generate predictions that specify predicted three-dimensional positions of objects in the input sensor data. For example, the output can define coordinates of three-dimensional bounding boxes in the sensor data that are predicted to include measurements of objects.

Autonomous vehicles include self-driving cars, boats, and aircraft. Autonomous vehicles use a variety of on-board sensors and computer systems to detect nearby objects and use such detections to make control and navigation decisions.

BRIEF DESCRIPTION OF THE DRAWINGS

Like reference numbers and designations in the various drawings indicate like elements.

DETAILED DESCRIPTION

Figure 1:
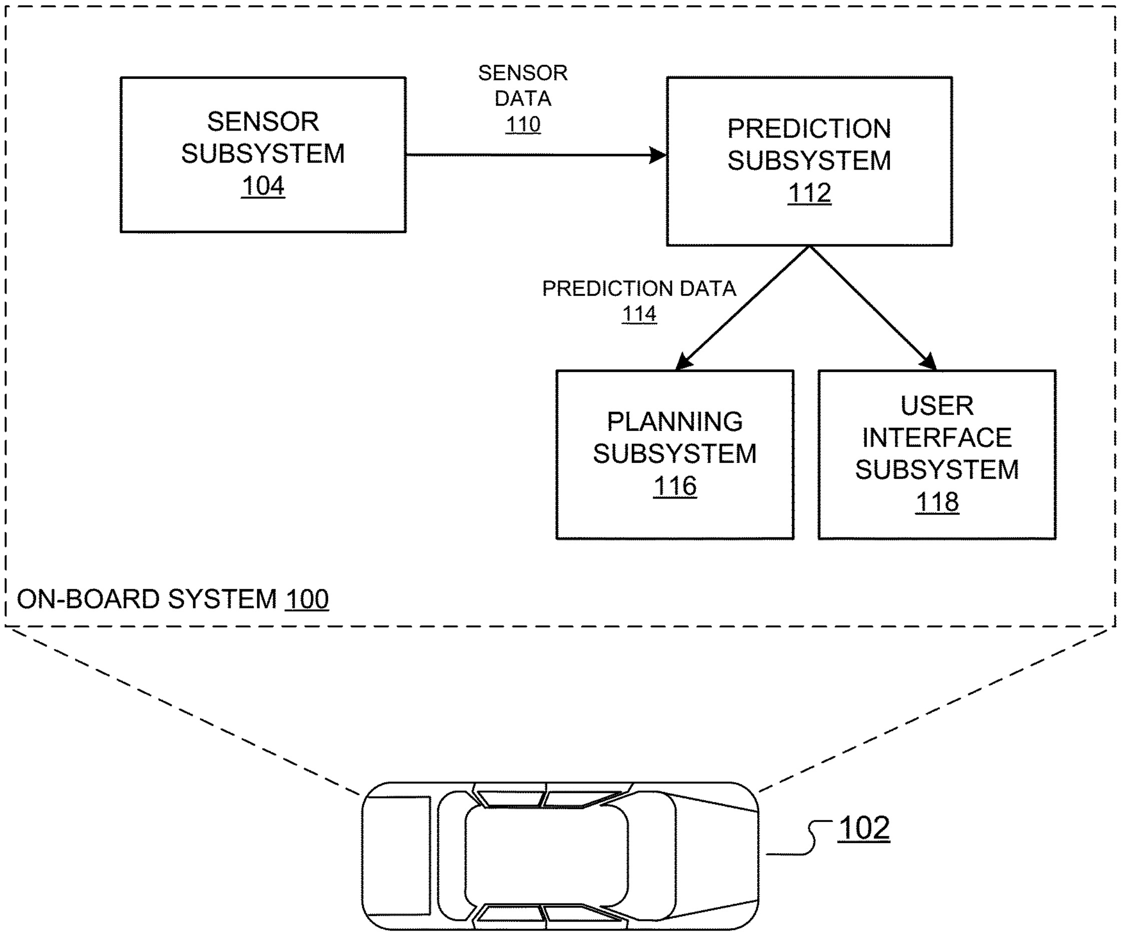
FIG. 1 is a block diagram of an example on-board system.

This specification describes a system implemented as computer programs on one or more computers in one or more locations that performs rare example mining in sensor data. Rare example mining is a type of data mining that focuses on identifying and analyzing infrequent or rare events or patterns in large datasets. It involves searching for data instances that are rare or unique compared to the rest of the data, and then extracting insights or knowledge from these data instances.

In the case of object detection, a rare example may refer to a data instance of an object or class that occurs infrequently in a dataset, e.g., a driving log or another data log, but is important for the vehicle to identify accurately and respond to appropriately. For example, a rare example in this context could be an unconventional road sign or a vehicle with a non-standard appearance. In the case of behavior prediction, a rare example may refer to a data instance of a rare movement or an unusual behavior of an agent, such as a sudden lane change or an unexpected stop, that is not always well represented in the dataset. Accurately identifying these rare examples can improve the performance of an autonomous vehicle in a variety of ways. For example, the rare examples can be used to generate training data that is diverse, class-balanced, or both for a neural network, e.g., an object detection or classification neural network to be deployed on-board the autonomous vehicle that receives input sensor data and generates object detection or classification outputs. As another example, the rare examples can be used to test or evaluate the control software of the autonomous vehicle in simulation to determine how well the autonomous vehicle handles the rare events or objects represented in the rare examples.

Identifying and accurately accounting for rare examples in a set of data is a difficult problem. Some conventional approaches identify rare examples in a set of labeled data based on object class labels, so that classes appearing relatively infrequently in a set of data are identified as rare. However, these techniques do not account for the fact that objects within the same class label can have drastically varied properties, with certain properties being more frequent than others. For example, humans dressed in various types of clothing may all have the same class label of pedestrian, however certain costumes (e.g., Halloween costumes or masquerade ball costumes) may change the shapes of the human's body, thus rendering them different from the common shapes of other human dressed in everyday clothes. Moreover, these existing techniques fail to identify rare events that occur across time, e.g., to identify vehicles or other agents that follow trajectories that are rarely observed in a given context. More importantly, the quantity of labeled data is relatively small relative to unlabeled data and these techniques are not applicable to unlabeled data.

Computing a rareness measure from a density of feature vectors of data instances in an embedding space by using techniques described in this specification enables automatic mining of rare examples in an arbitrarily large set of unlabeled data, i.e., with no or minimal human input needed. Leveraging such a rareness measure to identify rare examples can improve the performance of an autonomous vehicle in a variety of ways. For example, the identified rare examples can be used to more comprehensively test or evaluate the control software of the autonomous vehicle in simulation. As another example, the identified rare examples facilitate faster root cause analysis in the cases where an issue does occur within an on-board system of the autonomous vehicle and correspondingly, reduce the processing resources that would otherwise be required to resolve such an issue. By identifying the first point in the system where abnormally high rareness occurs, pinpointing the root cause, or source of the problem, becomes easier.

As another example, when incorporated into the training data, these identified rare examples can improve the capability of trained neural networks to handle rare or unusual scenarios. The rare example mining techniques described in this specification can improve overall model performance, and more importantly, the performance with respect to rare data instances, while consuming fewer computing resources and being faster in terms of wall-clock time than the existing techniques. When deployed within an on-board system of a vehicle, processing sensor data using neural networks that have been trained on training data obtained using the described rare example mining techniques can be used to make autonomous driving decisions for the vehicle with enhanced overall road safety and/or efficiency.

In particular, the system receives labeled or unlabeled sensor inputs and uses rare example mining to identify sensor inputs to include in training data for training the neural network.

Once the training data has been generated, the system or another system can train the neural network to perform a specified task and then use the trained neural network to perform inference.

As a particular example, the neural network that is being trained can be a three-dimensional object detection neural network that receives input sensor data, e.g., point cloud data, and generates object detection outputs, i.e., predictions that specify predicted three-dimensional positions of objects in the input sensor data. For example, the output can define coordinates of three-dimensional bounding boxes in the sensor data that are predicted to include measurements of objects.

In this example, the generation of the training data and the training of the neural network can be performed by a training system in a data center and then the trained neural network can be deployed on-board an autonomous vehicle that makes autonomous or semi-autonomous driving decisions.

For example, the object detection, the behavior prediction, or both can be performed by an on-board computer system of the autonomous vehicle as the vehicle is navigating through the environment. The object detections or the behavior predictions can then be used by the on-board system to control the autonomous vehicle, i.e., to plan the future motion of the vehicle based in part on where objects in the environment have been detected, or how other agents in the environment have been predicted to act.

FIG. 1 is a block diagram of an example on-board system 100. The on-board system 100 is physically located on-board a vehicle 102. Being on-board the vehicle 102 means that the on-board system 100 includes components that travel along with the vehicle 102, e.g., power supplies, computing hardware, and sensors. In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver. In another example, in response to determining that another agent might interact with the vehicle 102, the vehicle 102 can alert the driver or autonomously apply the brakes of the vehicle 102 or otherwise autonomously change the trajectory of the vehicle 102 to prevent an unwanted interaction between the vehicle 102 and an agent.

Although the vehicle 102 in FIG. 1 is depicted as an automobile, and the examples in this document are described with reference to automobiles, in general the vehicle 102 can be any kind of vehicle. For example, besides an automobile, the vehicle 102 can be another kind of autonomous vehicle that travels along a roadway, e.g., a truck or a motorcycle. Moreover, the on-board system 100 can include components additional to those depicted in FIG. 1 (e.g., a collision detection system or a navigation system).

To enable the safe control of the autonomous vehicle 102, the on-board system 100 includes a sensor subsystem 104 which enables the on-board system 100 to "see" the environment in the vicinity of the vehicle 102. More specifically, the sensor subsystem 104 includes one or more sensors, some of which are configured to receive reflections of electromagnetic radiation from the environment in the vicinity of the vehicle 102. For example, the sensor subsystem 104 can include one or more laser sensors (e.g., LiDAR sensors) that are configured to detect reflections of laser light. As another example, the sensor subsystem 104 can include one or more radar sensors that are configured to detect reflections of radio waves. As another example, the sensor subsystem 104 can include one or more camera sensors that are configured to detect reflections of visible light.

The sensor subsystem 104 continually (i.e., at each of multiple time points) captures raw sensor measurements which can indicate the directions, intensities, and distances travelled by reflected radiation. For example, a sensor in the sensor subsystem 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight. The sensor subsystems 104 can also include a combination of components that receive reflections of electromagnetic radiation, e.g., LiDAR systems that detect reflections of laser light, radar systems that detect reflections of radio waves, and camera systems that detect reflections of visible light.

The sensor subsystem 104, or another subsystem such as a data representation subsystem also on-board the vehicle 102, uses the raw sensor measurements (and, optionally, additional data available in data repositories stored within the autonomous vehicle 102, or data repositories outside of, but coupled to, the autonomous vehicle, such as in a data center with the data available made to the autonomous vehicle over a cellular or other wireless network) to generate sensor data 110 that that characterizes the agents and environment in the vicinity of the vehicle 102.

For example, the environment can be an environment in the vicinity of the vehicle 102 as it drives along a roadway. The term "vicinity," as used in this specification, refers to the area of the environment that is within the sensing range of the one or more sensors of the vehicle 102. The agents in the vicinity of the vehicle 102 may be, for example, pedestrians, bicyclists, or other vehicles.

The sensor data 110 can be generated in any of a variety of ways. In some implementations, the sensor subsystem 104 can classify groups of raw sensor measurements from one or more sensors, e.g., a camera sensor, a LiDAR sensor, or both, as being measures of another agent in the environment. A group of sensor measurements (referred to below as a "sensor input") can be represented in any of a variety of ways, depending on the kinds of sensor measurements that are being captured. For example, each group of raw laser sensor measurements (e.g., raw LiDAR sensor measurements) can be represented as a three-dimensional point cloud (e.g., a LiDAR point cloud) with each point having an intensity and a position, where the position is represented as a range and elevation pair. As another example, each group of camera sensor measurements can be represented as an image patch, e.g., an RGB image patch. Once the one or more groups of raw sensor measurements are classified as being measures of respective other agents, the sensor subsystem 104 can compile the raw sensor measurements into a set of sensor data 110.

The on-board system 100 can send the sensor data 110 to one or more data repositories within the vehicle 102, or data repositories outside of the vehicle 102, such as in a data center, over a cellular or other wireless network, where the sensor data is logged. The logged sensor data can later be used to identify rare examples, e.g., for use in further training machine learning models on-board the vehicle 102 or on-board other vehicles or for use in testing the operation the control software of the vehicle 102 in simulation. In addition, the on-board system 100 can provide the sensor data 110 to a prediction subsystem 112 of the on-board system 100. The on-board system 100 uses the prediction subsystem 112 to continually (i.e., at each of the multiple time points) generate prediction data 114 which predicts certain aspects of some or all of the agents in the vicinity of the vehicle 102.

For example, the prediction data 114 can be or include object detection prediction data that specifies one or more regions in an environment characterized by the sensor data 110 that are each predicted to depict a respective object. For example, the prediction data 114 can define a plurality of bounding boxes with reference to the environment characterized by the sensor data 110 and, for each of the plurality of bounding boxes, a respective likelihood that an object belonging to an object category from a set of possible object categories is present in the region of the environment shown in the bounding box.

As another example, the prediction data 114 can be or include object classification prediction data which defines, for each of multiple agents in the vicinity of the vehicle 102, respective probabilities that the agent is each of a predetermined number of possible agent types (e.g., animal, pedestrian, bicyclist, car, truck, and so on).

As another example, the prediction data 114 can be or include trajectory prediction data that defines, for each of the multiple agents in the vicinity of the vehicle 102, one or more predicted future trajectories for the agent. In some cases, the trajectory prediction data can deterministically define the one or more predicted future trajectories, e.g., by defining multiple waypoints along a regressed path, i.e., a predicted future path, in the environment along which the agent will travel within a certain period of time in the future, e.g., within the next 3, 5, or 10 seconds after the current time point. In some other cases, the trajectory prediction data can stochastically define the one or more predicted future trajectories, e.g., by defining a probability distribution over a space of possible future trajectories or over a discrete set of anchor trajectories. Suitable neural networks that can be configured to generate such prediction data 114, e.g., from the sensor data 110, data derived from the sensor data 110, or both, are described in more detail in Zhang, Zhishuai, et al. "Stinet: Spatio-temporal-interactive network for pedestrian detection and trajectory prediction." Proceedings of the IEEE CVF Conference on Computer Vision and Pattern Recognition. 2020, and Gao, Jiyang, et al. "Vectornet: Encoding hd maps and agent dynamics from vectorized representation." Proceedings of the IEEE CVF Conference on Computer Vision and Pattern Recognition. 2020.

As another example, the prediction data 114 can be or include behavior or intent prediction data which defines, for each of multiple agents in the vicinity of the vehicle 102, respective probabilities that the agent makes each of a predetermined number of possible driving decisions (e.g., yielding, changing lanes, passing, braking, accelerating, vehicle door opening, and so on).

The on-board system 100 can provide the prediction data 114 generated by the prediction subsystem 116 to a planning subsystem 116, a user interface subsystem 118, or both.

When the planning subsystem 116 receives the prediction data 108, the planning subsystem 116 can use the prediction data 114 to generate planning decisions which plan the future motion of the vehicle 102. The planning decisions generated by the planning system 110 can include, for example: yielding (e.g., to pedestrians), stopping (e.g., at a "Stop" sign), passing other vehicles, adjusting vehicle lane position to accommodate a bicyclist, slowing down in a school or construction zone, merging (e.g., onto a highway), and parking. In a particular example, the on-board system 100 may provide the planning subsystem 116 with trajectory prediction data indicating that the future trajectory of another vehicle is likely to cross the future trajectory of the vehicle 102, potentially resulting in a collision. In this example, the planning subsystem 116 can generate a planning decision to apply the brakes of the vehicle 102 to avoid a collision.

The planning decisions generated by the planning subsystem 116 can be provided to a control subsystem of the vehicle 102. The control subsystem of the vehicle can control some or all of the operations of the vehicle by implementing the planning decisions generated by the planning subsystem. For example, in response to receiving a planning decision to apply the brakes of the vehicle, the control subsystem of the vehicle 102 may transmit an electronic signal to a braking control unit of the vehicle. In response to receiving the electronic signal, the braking control unit can mechanically apply the brakes of the vehicle.

When the user interface subsystem 118 receives the prediction data 114, the user interface subsystem 118 can use the prediction data 114 to present information to the driver of the vehicle 102 to assist the driver in operating the vehicle 102 safely. The user interface subsystem 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102).

To generate the various prediction data 114 from the sensor data 110, the prediction subsystem 112 implements trained neural networks that are each configured to process inputs derived from the sensor data 110 in accordance with trained parameters of the neural network to generate respective outputs that are included in the prediction data 114. For example, the neural networks can include one or more object detector or classifier neural networks that are configured to process the sensor data 110 to generate detection or classification outputs with respect to the objects depicted in the sensor data 110, one or more trajectory prediction neural networks that are configured to process the sensor data 110 to generate a respective predicted trajectory for an agent depicted in the sensor data 110, one or more agent intent prediction models that are configured to process the sensor data 110 to generate intent predictions for an agent depicted in the sensor data 110, and so on.

A neural network is said to be "trained" if the neural network has been trained on training data to compute a desired prediction. In other words, a trained neural network generates an output based solely on being trained on training data rather than on human-programmed decisions. Training neural networks using training data obtained through rare example mining, as described below, improves the performance of the trained neural networks on rare examples by ensuring that they are given appropriate weight during training. Example rare examples include data instances that do not appear frequently in a data log, such as vehicles with irregular shapes and sizes, e.g., a commercial truck with a cargo carrying trailer, or pedestrians with atypical behaviors, e.g., a flash mob gathering on the street.

Figure 2:
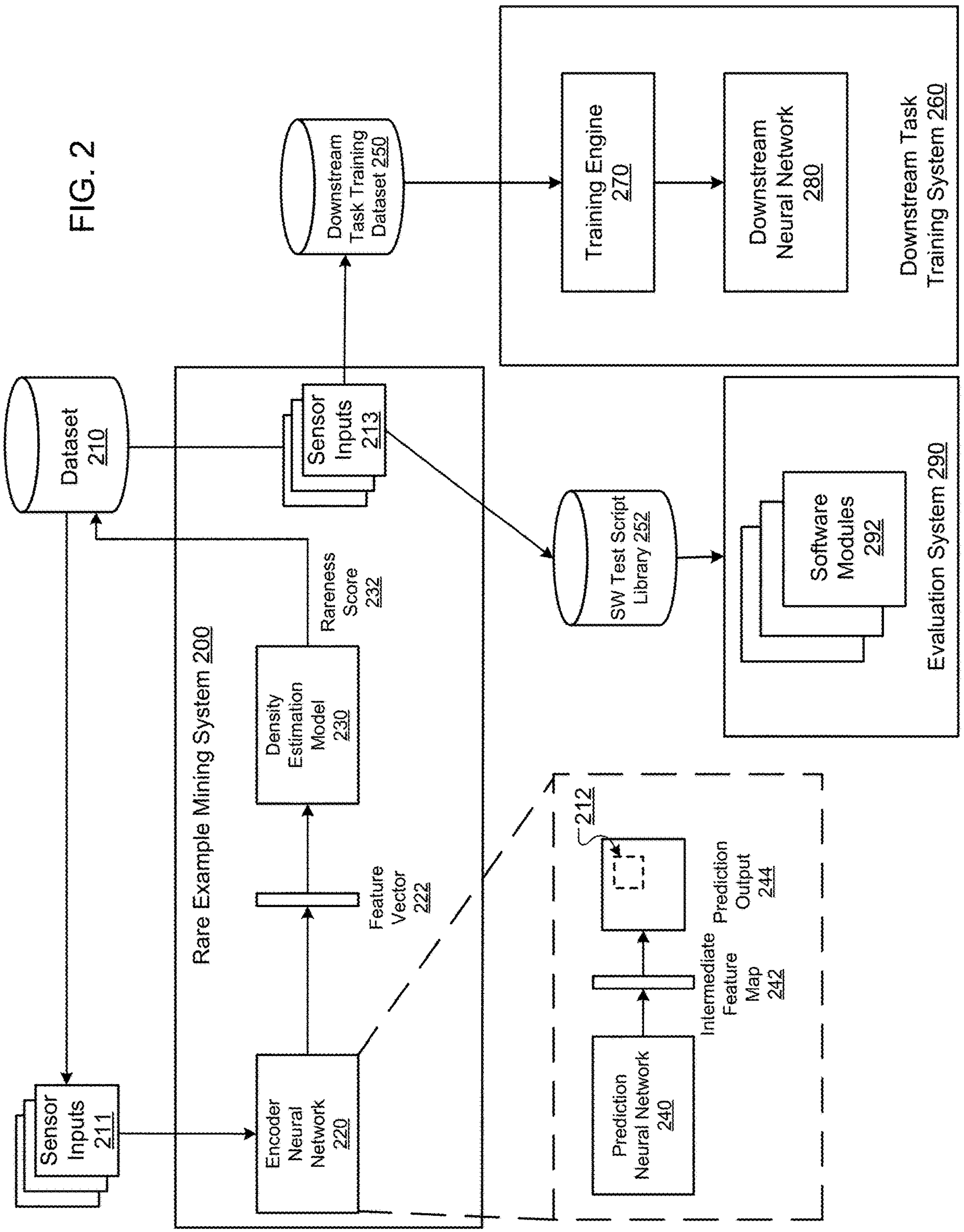
FIG. 2 is a block diagram of an example rare example mining system, a downstream task training system, and an evaluation system.

FIG. 2 is a block diagram of an example rare example mining system 200, a downstream task training system 260, and an evaluation system 290. The rare example mining system 200, the downstream task training system 260, and the evaluation system 290 are examples of systems implemented as computer programs on one or more computers in one or more locations in which the systems, components, and techniques described below are implemented. While the on-board system 100 may be implemented on-board a vehicle as described above, the rare example mining system 200, the downstream task training system 260, and the evaluation system 290 are typically hosted within the same or different data centers. A data center can be a distributed computing system having hundreds, thousands, or more computers in one or more locations.

The rare example mining system 200 can access a dataset 210 that includes multiple sensor inputs 211. Each sensor input 211 can include, e.g., a LiDAR point cloud generated by a LiDAR sensor, an image captured by camera sensor, or a fused sensor input that combines data from multiple sensors. Each sensor input 211 can be labeled or unlabeled. A labeled sensor input is a sensor input for which a known network output, e.g., a set of ground truth 3-D bounding boxes with respect to a point cloud, is made available to the system 200 according to the label information contained in the dataset. An unlabeled sensor input is a sensor input for which information about a known network output, e.g., a set of ground truth 3-D bounding boxes with respect to the point cloud, is not specified by dataset and is thus not readily available to the system 200.

The dataset 210 may be obtained from data that is derived from real or simulated driving logs. A real driving log stores the raw sensor data that is continually generated by the sensor subsystem 104 on-board the vehicle 102 as the vehicle navigates through real-world environments that includes multiple agents, such as other vehicles. As described with reference to FIG. 1, the raw sensor data may be captured by one or more sensors of the vehicle, including one or more of: laser sensors, radar sensors, and camera sensors. A simulated driving log stores simulated sensor data. Simulated sensor data is generated by a software simulation of the environment. That is, the simulated sensor data simulates sensor data that would be generated by sensors of a vehicle.

The rare example mining system 200 can then generate, from the dataset 210, a training dataset 250 for a downstream task that operates on sensor inputs, e.g., three-dimensional object detection, behavior prediction for agents in the vicinity of the vehicle, planning a future trajectory of the vehicle, or the like.

To perform rare example mining, the rare example mining system 200 includes an encoder neural network 220 and a density estimation model 230. For each sensor input 211 included in the dataset 210, the system 200 uses the encoder neural network 220 to generate one or more feature vectors for the sensor input. Then, for each of the one or more feature vectors, the system 200 uses the density estimation model to generate a density score for the feature vector.

In some implementations, the encoder neural network 220 can be configured through training to generate intermediate feature maps based on the sensor inputs 211. The intermediate feature maps can represent the sensor inputs 211 in any appropriate numerical format. The intermediate feature maps can take the form of embeddings in an embedding space. An "embedding" as used in this specification is a vector of numeric values, e.g., floating point values or other values, having a pre-determined dimensionality. The space of possible vectors having the pre-determined dimensionality is referred to as the "embedding space."

To generate these intermediate feature maps, in some implementations, the encoder neural network 220 operates directly on the sensor inputs 211 while in other implementations, the encoder neural network 220 operates on pre-processed sensor data that is generated by another data pre-processing engine from the sensor inputs 211, additional data that is not included in the sensor inputs (e.g., road graph data or map data), or both. For example, the other system can be a data representation system that pre-processes the sensor inputs 211 to extract history data for the vehicle 102 and each other agent in the environment and then generates a data-efficient representation of the environment, e.g., as a top down image or as vectors or as polylines.

In some implementations, these intermediate feature maps can be used as-is as the feature vectors 222 by the system 200 while in other implementations, the system 200 can generate the feature vectors 222 for the sensor inputs 211 from the intermediate feature maps by additionally processing these intermediate feature maps. For example, one or more feature vectors 222 can be generated from an intermediate feature map of a sensor input 211 by cropping the intermediate feature map (e.g., using region of interest (ROI) pooling), applying a predetermined sequence of transformations, and so on. In either implementation, the feature vectors 222 may be viewed as being located in the embedding space that is different from a sensor data space, which may have a different, e.g., higher, data dimensionality than the embedding space.

In some implementations, the encoder neural network 220 is trained as part of a prediction neural network 240 having a larger architecture trained to perform any of a variety of tasks—including two-dimensional or three-dimensional object detection, object classification, trajectory prediction, and behavior or intent prediction—as described previously with reference to the prediction subsystem 112 of FIG. 1, and possibly additional tasks that depend on the outputs of these tasks. An intermediate feature map 242 of the sensor input 211 is thus an intermediate output generated at a hidden layer of the prediction neural network 240 during its processing of respective intermediate outputs of multiple hidden layers to generate the final prediction output 244 from the sensor inputs.

In these implementations, as a result of the training of the prediction neural network, such intermediate feature maps may capture rich semantic information that characterizes certain properties of the sensor input 211. For example, if the prediction neural network 240 is trained to generate as prediction output 244 object detection prediction data, then the intermediate feature map 242 may contain information that characterizes visual properties of one or more regions 212 of the sensor input 211 that are each predicted to depict a respective object, i.e., according to the object detection prediction data. As another example, if the prediction neural network 240 is trained to generate as prediction output 244 agent behavior prediction data, then the intermediate feature map 242 may contain information that characterizes, for an agent depicted in the sensor input 211, a motion of the agent given the environment context, e.g., given some or all of the states of the environment when the motion occurred. For example, the intermediate feature map 242 may contain information that characterizes the motion of the agent relative to another agent, a spatial relationship of environment objects to the agent, or the like.

For each of the one or more feature vectors 222 that have been generated for a sensor input 211 obtained from the dataset 210, the rare example mining system 200 uses the density estimation model 230 to generate a density score for the feature vector 222 that represents an estimate of a density of the feature vector 222 in a given set of feature vectors. From the density score, a rareness score 232 for the feature vector 222 can then be computed, e.g., as an additive inverse or another transformed value of the density score. The rareness score 232 for the feature vector 222 represents the degree to which a region of the sensor input 211, an object depicted in the region, or both, are rare, relative to those in other feature vectors.

In some implementations, the density estimation model 230 is configured as a normalizing flow model, which can compute a sequence of (invertible) transformations realized by multiple layers of a neural network. The sequence of transformations can take many forms, with choices including masked scale and shift functions, or continuous bijector transformation functions utilizing learned ordinary differential equation (ODE) dynamics. For example, a first neural network layer of the normalizing flow model can apply a shift transformation to the first layer input to generate the first layer output, a second neural network layer of the normalizing flow model can apply a scale transformation to the second layer input to generate the second layer output, a third neural network layer of the normalizing flow model can apply a rotate transformation to the third layer input to generate the third layer output, and so on until reaching an output neural network layer, which applies a sigmoid transformation to the output layer input to generate the output of the normalizing flow model.

In particular, the density estimation model 230 operates on feature vectors 222 in the embedding space generated by the encoder neural network 220, rather than directly on sensor inputs 211 in the sensor data space.

In the context of rare example mining, a normalizing flow may be understood as a mapping from a first probability distribution to a second probability distribution. In order to determine the mapping, the normalizing flow model can be trained with a training set of feature vectors to determine gradient-based updates to parameter values of the normalizing flow model to maximize an expected log density score of the feature vectors in the training set (or equivalently to minimize an expected negative log likelihood of the parameters of the normalizing flow model), with respect to the second probability distribution. In some implementations, the training set of feature vectors can be generated by processing each sensor input in a set of sensor data that includes sensor inputs different from those included in the dataset 210 by using the encoder neural network 220 to generate one or more feature vectors for the sensor input.

The feature vectors in the training set of feature vectors used to train the normalizing flow model may be understood as samples of the first probability distribution; the second probability distribution may be any of a variety of data distributions. Simply put, the way the set of sensor data for training the normalizing flow model is selected significantly defines the characteristics of the first probability distribution. For example, when training the normalizing flow model with feature vectors generated from sensor input of highway scenarios only, a feature vector generated from a sensor input of an urban scenario will have a low density score; however, if feature vectors generated from sensor inputs of urban scenarios are also among the training set, the density score will rise.

The advantage of using a normalizing flow for feature vectors is hence that the first probability distribution may be mapped into the second probability distribution, where the second probability distribution may be chosen such that it has certain favorable traits. For example, a multi-variate distribution, e.g., a spherical multivariate Gaussian distribution, can be chosen as the second probability distribution. This allows for easy and efficient assessment of a density value for a given feature vector, as the feature vector can be mapped to the second probability distribution by the normalizing flow and a density value may be computed based on the second probability distribution in closed form.

The density score for the feature vector represents an estimate of a density of the feature vector 222 in the training set of feature vectors. The density value may be understood as characterizing a likelihood or probability of the given feature vector to occur in the training set of feature vectors. The likelihood of a given feature vector 222 to occur may be understood as how likely it is that the given feature vector 222 appeared in the training set of feature vectors used to train the normalizing flow model; the lower the likelihood of a given feature vector 222, the higher the rareness score 232 of the given feature vector 222. Using such a rareness score as a quantitative metric that represents the degree to which the object captured by a sensor input is rare, the rare example mining system 200 can more effectively and efficiently identify, from the dataset 210, certain sensor inputs 211 that characterize objects with unique appearances, uncommon behaviors, and/or rare other characteristics relative to other objects.

As a particular example, a rareness score for a feature vector can be computed as an additive inverse of a density score for the feature vector:

$$r = -\log p_\theta(x),$$

where the density score $\log p_\theta(x)$ can be computed as:

$$\begin{aligned}\log p_\theta(x) &= \log p(f_\theta(x)) + \log\left|\det\left(df_\theta(x)/dx\right)\right| \\ &= \log p(z) + \log\left|\det\left(dz/dx\right)\right|\end{aligned},$$

where x is an input feature vector to the normalizing flow model, p is the probability density function of the second probability distribution, f is the transformation function, θ are the learnable parameters of the transformation function, and $z=f_\theta(x)$. Thus, in this example, feature vectors with lower density scores can have higher rareness scores, and vice versa. In other words, the rarer the example represented by the feature vector x, the higher the rareness score r.

Figure 3:
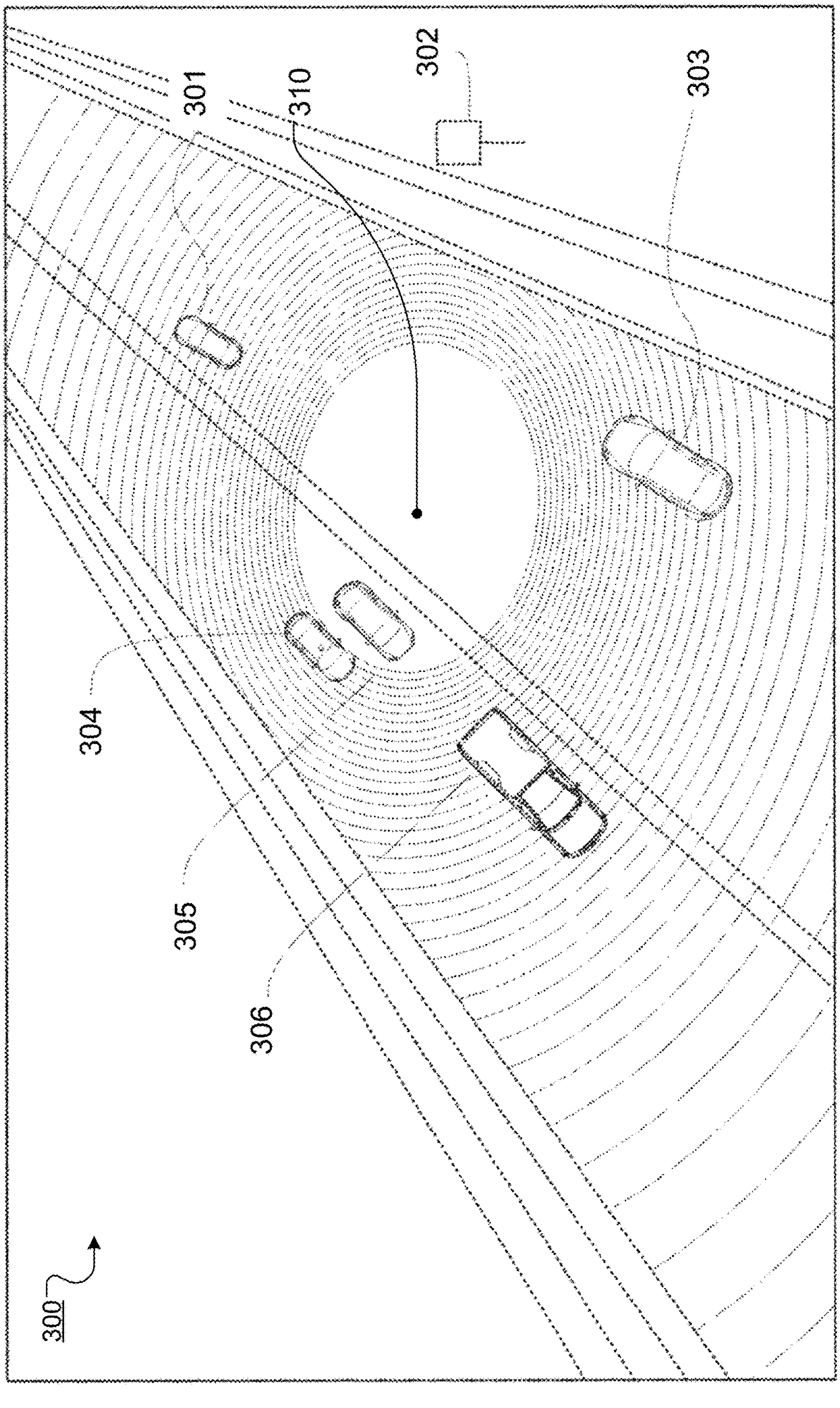
FIG. 3 is an example illustration of a LiDAR sensor input.

FIG. 3 is an example illustration of a LiDAR sensor input. FIG. 3 shows an example LiDAR point cloud 300 that may be captured by the one or more LiDAR sensors of the vehicle 102. The LiDAR point cloud 300 shows a 360° view of a frame perceived by the sensor subsystem 104 of the vehicle 102. In this frame, the vehicle 102 is driving on a two-lane road. The position of the vehicle 102 is shown as 310. Various objects 301, 302, 303, 304, 305, and 306 are shown in the LiDAR point cloud 400. For example, objects 301, 303, 304, 305, and 306 may correspond to vehicle agents driving around the vehicle 102, while object 302 may correspond to a street sign on a side of the street.

Figure 4:
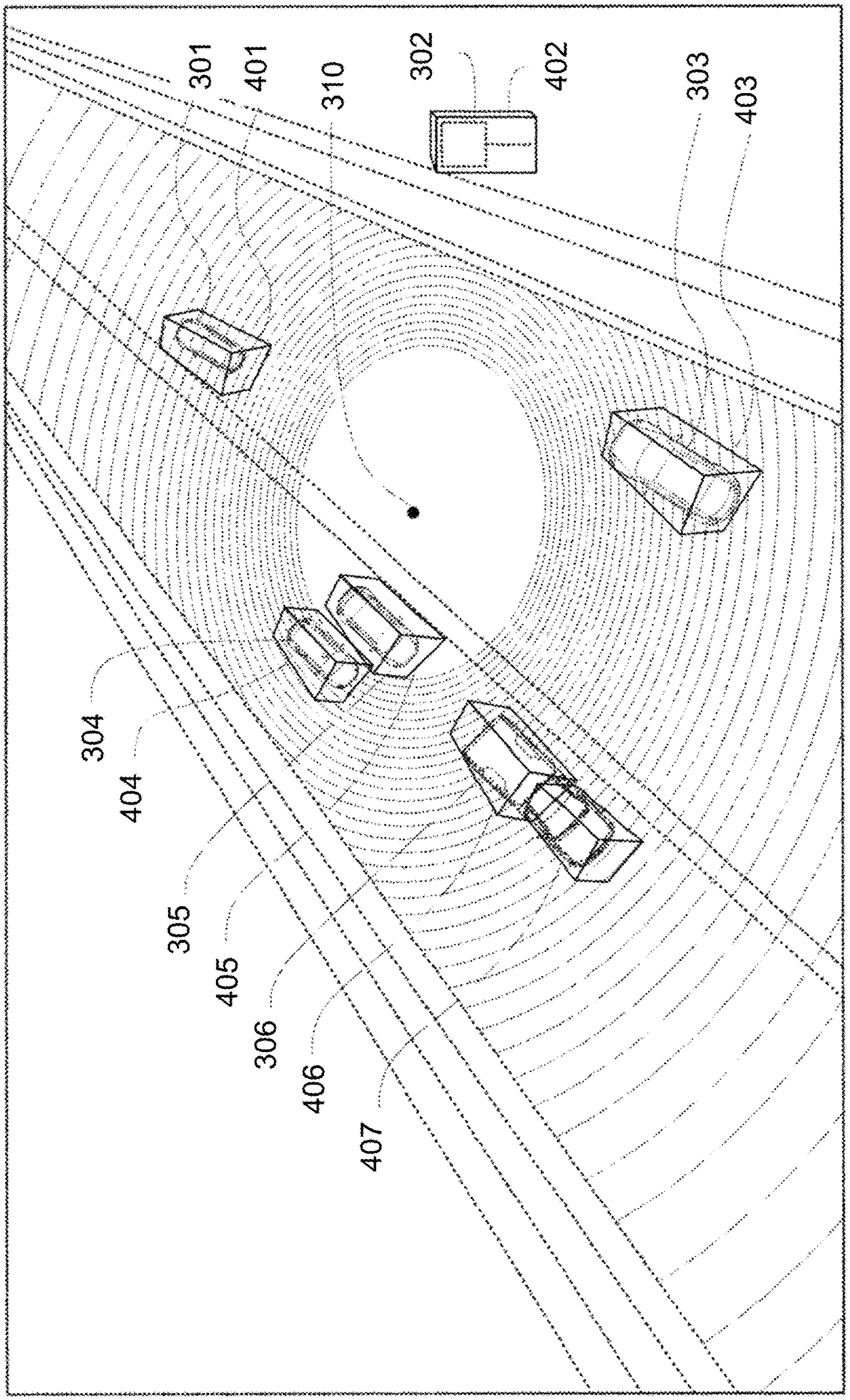
FIG. 4 is an example illustration of a prediction output for the LiDAR sensor input of FIG. 3.

FIG. 4 is an example illustration of a prediction output for the LiDAR sensor input of FIG. 3. The prediction output includes object detection prediction data generated by a prediction neural network. The object detection prediction data includes a 3-D bounding box encompassing each detected object in the LiDAR point cloud. The bounding box may be rectangular, oval, or any other shape. As shown in FIG. 4, the object detection prediction data includes bounding box 401 for object 301, bounding box 402 for object 302, bounding box 403 for object 303, bounding box 404 for object 304, bounding box 405 for object 305, and bounding boxes 406 and 407 for object 306 (one corresponding to the cab of the truck, and one corresponding to the trailer of the truck).

In the example of FIG. 4, the rare example mining system 200 can use the encoder neural network 220, which has been trained as part of a larger prediction neural network 240 trained to generate object detection prediction data, to generate a feature vector 222 for each of one or more regions within the LiDAR sensor input that are candidates for depicting an object. The rareness score 232 for a given region represents the degree to which the object depicted by the region is rare, e.g., the degree to which the object is an intra-class rare instance. An intra-class rare instance is an object that has one or more properties that occur rarely across other objects in the same object class to which the object belongs. One example of a rare object is an irregularly shaped vehicle, i.e., a vehicle whose shape has properties that are not shared by the vast majority of the other vehicles. As a particular example, a large vehicle can be an irregularly shaped vehicle. Thus a feature vector for a region which depicts object 306 (a truck) may have a relatively higher rareness score. Another example of a rare object is a pedestrian dressed in a costume that changes the shape of the pedestrian's body, i.e., such that the pedestrian has an appearance that is not shared by many other pedestrians. Generally, higher rareness scores reflect an increased degree of rarity. The corresponding sensor inputs that characterize such rare objects can, in turn, be used to improve (or evaluate) the performance of a prediction neural network that is configured to generate these 3-D bounding boxes with reference to LiDAR point clouds.

Figure 5A:
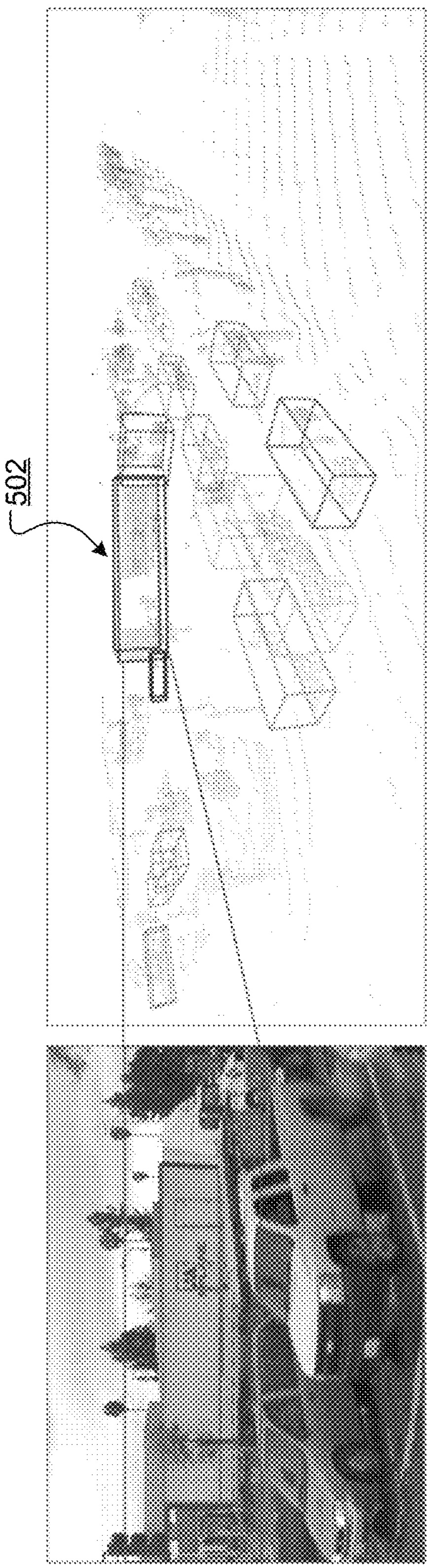
FIGS. 5A-B are example illustrations of rare objects.
Figure 5B:
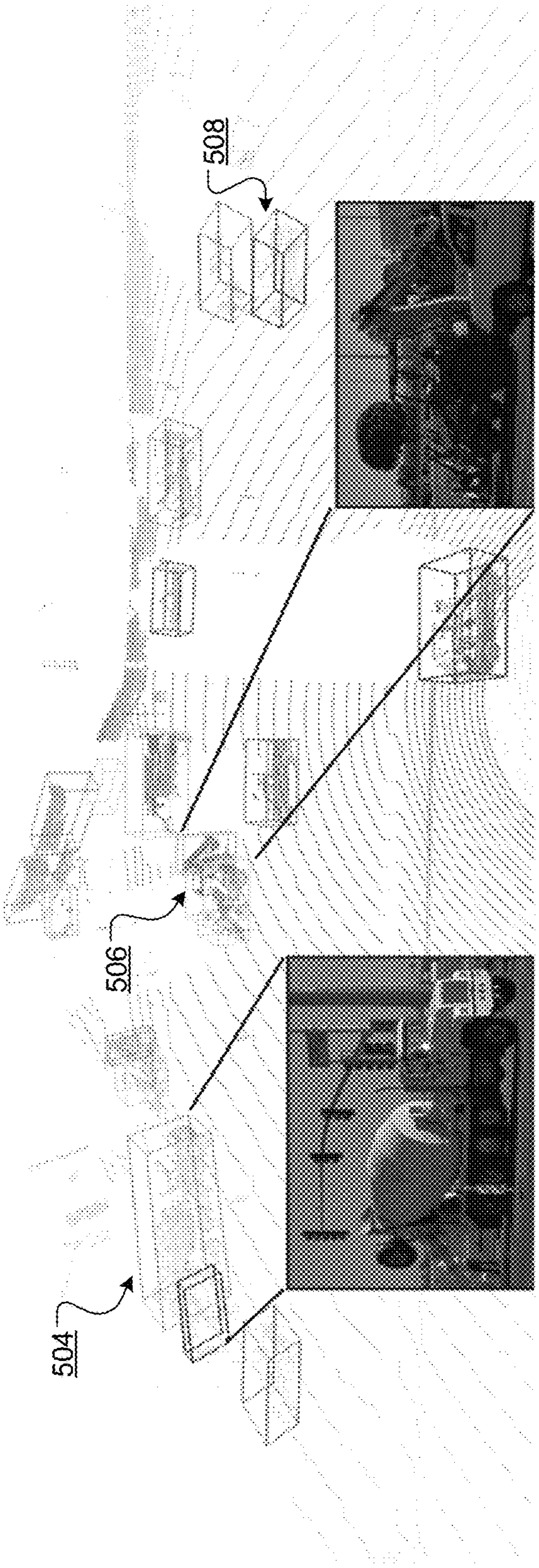

FIG. 5A-B are example illustrations of rare objects. In FIG. 5A, the semi-trailer truck 502 may be considered as a rare object by the rare example mining system 200 based on the rareness scores computed by the system 200. In FIG. 5B, a concrete mixer truck 504 and a tractor vehicle 506 may each be considered as a rare object. In contrast, a sedan vehicle 508 in FIG. 5B would not be considered as a rare object by the rare example mining system 200 based on the rareness scores computed by the system 200. In the implementations where the encoder neural network 220 has been trained as part of a larger prediction neural network 240 trained to generate object detection prediction data, a feature vector generated from the region in a sensor input that depicts the semi-trailer truck 502, the concrete mixer truck 504, or the tractor vehicle 506 will have a relatively higher rareness score, as determined by using the density estimation model 230.

Other feature vectors may also have relatively higher rareness scores. For example, in the implementations where the encoder neural network 220 has been trained as part of a larger prediction neural network 240 trained to generate agent behavior prediction data, and assuming that there is another agent driving in a wrong direction in the lane along which the vehicle 102 (having the position of 310) is traveling, such that the other agent and the vehicle 102 are approaching each other, then a feature vector generated for the other agent will have a relatively higher rareness score. As another example, in the implementations where the encoder neural network 220 has been trained as part of a larger prediction neural network 240 trained to generate agent behavior prediction data, and assuming that there is another agent parked on a sidewalk, i.e., rather than on a roadway, then a feature vector generated for the other agent will have a relatively higher rareness score. The corresponding sensor inputs that characterize such rare agents can, in turn, be used to improve (or evaluate) the performance of a prediction neural network that is configured to generate agent behavior prediction data.

In particular, in each of the examples of FIGS. 3-4, and 5A-B, using the rareness score as a quantitative metric that represents the degree to which the object captured by a sensor input is rare can improve both effectiveness and computing resource efficiency when performing rare example mining from a dataset of sensor inputs. The rareness score can also be used to mitigate the inherent subjectiveness of other qualitative approaches, e.g., to identify a broader range of rare examples that are not biased toward a specific human viewer's knowledge or experience. For example, while the semi-trailer truck 502 in FIG. 5A may not be considered as a rare example by a developer of trajectory planning algorithms for automated trucking, it is still uncommon compared to the abundance of other sedan vehicles on the road and thus should be identified as a rare example.

Referring back to FIG. 2, the rare example mining system 200 uses the rareness scores 232 to perform rare example mining from the training dataset 210. In particular, the rare example mining system 200 selects feature vectors from the one or more feature vectors 222 that have been generated from each of the plurality of the sensor inputs 211 based on the respective rareness scores 232. For example, this selection can be done by selecting a specified number of feature vectors that have the highest rareness scores, or selecting feature vectors that have rareness scores that satisfy a predetermined rareness score threshold. As a particular example, the rare example mining system 200 can rank the respective feature vectors 222 generated from the plurality of sensor inputs 211 by rareness scores 232, and then select a proper subset of respective feature vectors having the highest rareness scores according to the ranking.

For each selected feature vector, the rare example mining system 200 can generate a training example that includes the sensor input 213 from which the selected feature vector has been generated (by the encoder neural network 220), and includes the training example in the training dataset 250. In some implementations, generating the training examples includes generating label data for the sensor inputs 213, e.g., by using an auto-labeling system that automatically generates label data, or by using a manual labeling system that employs, for example, a human labeler.

The downstream task training system 260 obtains the training dataset 250 and uses the training engine 270 to train a downstream neural network 280 on the training dataset 250 to update the values of the parameters of the downstream neural network 280. For example, the training engine 270 can train the downstream neural network 280 through supervised or unsupervised learning to minimize a loss that is appropriate for a downstream task that the downstream neural network 280 is configured to perform.

In some implementations, the training engine 270 trains the downstream neural network 280 to perform a downstream task that is distinct from any of the tasks that the prediction neural network 240 can be configured to perform. In other implementations, the training engine 270 trains the downstream neural network 280 to perform a downstream task that is the same as one of the tasks that the prediction neural network 240 can be configured to perform.

In these other implementations, the downstream task can be one of object detection, object classification, trajectory prediction, or agent behavior prediction task, and the downstream neural network 280 can be the same neural network as the prediction neural network 240. For example, the training engine 270 can train the downstream neural network 280 through supervised learning to minimize a classification loss function that includes a cross-entropy loss between the target classification output for a given training example and the classification output generated by the downstream neural network 280 for the given training example.

By re-training of the prediction neural network 240 using rare examples mined from the training dataset 210, the downstream task training system 260 can improve the performance of the prediction neural network 240 on the prediction task. That is, because the re-training process focuses on training examples generated from sensor inputs that infrequently or rarely occur in the training dataset 210, the re-training process causes the prediction neural network 240 to better accommodate infrequent or rare events or patterns in the training dataset 210, even when no extra training data is available.

After this training, the downstream task training system 260 can provide data specifying the trained downstream neural network 280 to the on-board system 100 of FIG. 1 for use in generating prediction data 114 that enables the generation of timely and accurate planning decisions by the planning subsystem 116. For example, the downstream task training system 260 provides, e.g., by a wired or wireless connection, the trained parameter values of the downstream neural network 280 to the on-board system 100.

Moreover, for each selected feature vector, the rare example mining system 200 can generate one or more test scripts that include or otherwise reference the sensor input 213 from which the selected feature vector has been generated (by the encoder neural network 220), and include the test scripts in a software test script library 252. Test scripts may be written in various programming languages, such as C#, C, C++, Java, JavaScript, Visual Basic, Python, Ruby, etc. Each test script may be written to include expected outputs under the condition characterized by the corresponding sensor input to test specific features or functions of any of a variety of software modules 292 that might be suitable for deployment in the on-board system 100.

An evaluation system 290 can then utilize these test scripts generated from the dataset 210 by the rare example mining system 200 to evaluate the performance, reliability, stability, or a combination thereof and possibly other aspects of a software module 292, e.g., during its development cycle and/or prior to its deployment in the on-board system 100 of FIG. 1, e.g., for quality assurance and/or development and operations, including issue discovery, performance hill climbing, or release evaluation. Evaluation can be performed through execution of a set of test scripts selected from the library 252 by a software module 292 and then analysis of the test results with respect to the expect outputs to identify software bugs or errors (particularly under rare scenarios that are not encountered frequently in everyday driving situations), or more generally, verify that the software module 292 is fit for autonomous driving use cases.

Figure 6:
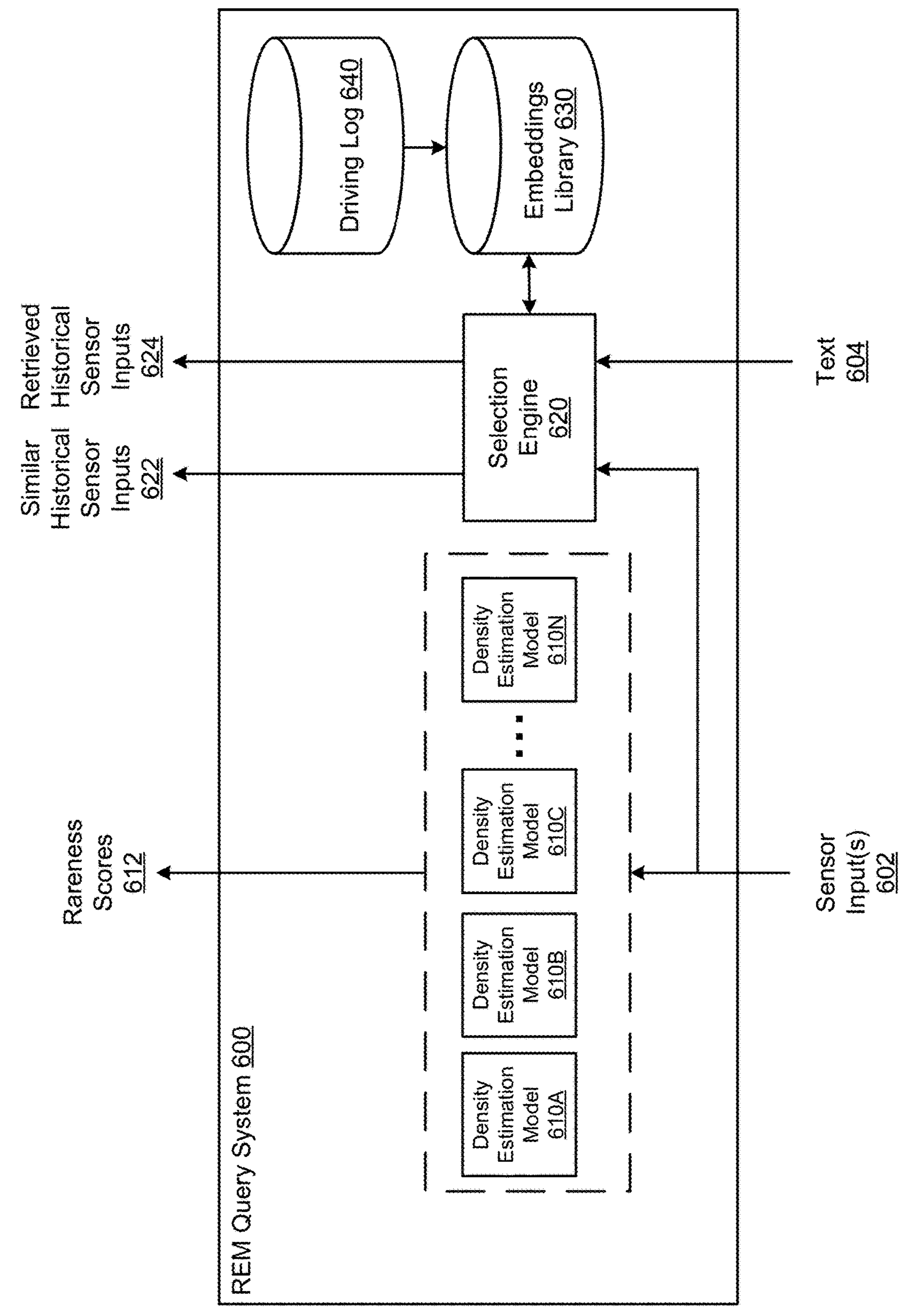
FIG. 6 is a block diagram of an example rare example mining (REM) query system.

FIG. 6 is a block diagram of an example rare example mining (REM) query system 600. The REM query system 600 is an example of a system implemented as computer programs on one or more computers in one or more locations in which the systems, components, and techniques described below are implemented.

The REM query system 600 maintains a library of embeddings 630 at one or more data stores. Each embedding can be a vector of numeric values. The library of embeddings 630 include a plurality of embeddings generated by neural networks that correspond respectively to different types of rareness from processing the historical sensor inputs stored in a driving log 640. The driving log may be either real or simulated. A real driving log stores raw sensor data that is continually generated by the sensor subsystem 104 on-board the vehicle 102 as the vehicle navigates through real-world environments. As described with reference to FIG. 1, the raw sensor data may be captured by one or more sensors of the vehicle, including one or more of: laser sensors, radar sensors, and camera sensors. A simulated driving log stores simulated sensor data. Simulated sensor data is generated by a software simulation of the environment. That is, the simulated sensor data simulates sensor data that would be generated by sensors of a vehicle.

In some implementations, metadata can be stored in association with the historical sensor inputs in the driving log 640. One example of the metadata is timestamp metadata which specifies the time at which the historical sensor inputs were generated by the sensors. Another example of the metadata is geolocation metadata which specifies the locations at which the historical sensor inputs were generated by the sensors.

In some implementations, the neural networks can include the prediction neural networks deployed within the prediction subsystem 112 of the on-board system 100 of FIG. 1. For example, the prediction neural networks can include one or more of a two-dimensional or three-dimensional object detection neural network, an object classification neural network, a trajectory prediction neural network, or a behavior prediction neural network. An embedding generated by any such neural networks thus can include a set of activations generated at one or more units of one or more hidden layers of the neural network in response to processing the historical sensor inputs in the driving log 640 as input.

Each prediction neural network may thus be viewed as being associated with a different type of rareness. For example, a first rareness type may represent a rareness in a category of an object depicted in the historical sensor inputs in the driving log 640, a second type of rareness may represent a rareness in a predicted future trajectory of the target agent depicted in the historical sensor inputs in the driving log 640, a third type of rareness may represent a rareness in a predicted behavior of the target agent (e.g., a motion, a spatial relationship, or both relative to the vehicle) depicted in the historical sensor inputs in the driving log 640, and so on.

In some implementations, the library of embeddings 630 can be stored in a same data store having multiple sections, where each section corresponds to a respective neural network. In other implementations, the library of embeddings 630 can be stored across multiple data stores that correspond to respective neural networks.

The REM query system 600 maintains a plurality of density estimation models 610A-N. Each density estimation model can be paired with a respective prediction neural network, and operates on density estimation model inputs derived from the embeddings generated by the respective prediction neural network in response to process the historical sensor inputs. Each density estimation model can be configured as a respective normalizing flow model, e.g., can operate on density estimation model inputs having a different data dimensionality, can be trained on a different training set of feature vectors, can implement a different mapping from the first probability distribution to the second probability distribution, and so on. More details of the density estimation model are described above with reference to FIG. 2.

The REM query system 600 can receive a query that references one or more sensor inputs 602 and use the plurality of density estimation models 610A-N to generate rareness scores 612 for each sensor input. In particular, for each sensor input, the REM query system 600 can use a corresponding density estimation model to generate a rareness score associated with each different type of rareness.

One or more embeddings (referred to below as "query embeddings") will be generated by the prediction neural networks during the processing of the sensor inputs 602 to output the rareness scores 612. The REM query system 600 thus can use a selection engine 620 to select, from the library of embeddings 630, one or more similar embeddings to the query embeddings generated from the sensor inputs 602 that are referenced in the query received by the system 600. Just like how the rareness scores are generated, the REM query system 600 can select, for each query embedding, one or more similar embeddings associated with each different type of rareness from the library of embeddings 630. For each similar embedding, the system can identify from the driving log 640 a historical sensor input 622 (referred to below as a "similar historical sensor input") from which the similar embedding has been generated.

Additionally or alternatively, the REM query system 600 can receive a query that includes text 604 and use the selection engine 620 to retrieve one or more sensor inputs 624 based on the text 604. For example, the text 604 may include phrases of one or more terms that are descriptive of user-specified contents that should appear in sensor inputs. The REM query system 600 can generate a textual embedding for the text 604 and then select, for the textual embedding and from the library of embeddings 630, one or more embeddings that are similar to the textual embedding for the text 604. For each embedding, the system can identify from the driving log 640 a historical sensor input 624 (referred to below as a "retrieved historical sensor input") from which the embedding has been generated. The textual embedding can be generated by a textual embedding neural network which has been jointly trained with the prediction neural networks to process text, e.g., the text in text-sensor input pairs where the text in each pair describes the contents of the sensor input in the pair, to generate textual embeddings, e.g., in a same embedding space as the plurality of embeddings from the library of embeddings 630.

The REM query system 600 can provide the rareness scores 612, the similar historical sensor inputs 622, the retrieved historical sensor inputs 624, or a combination thereof in response to the query.

Figure 7:
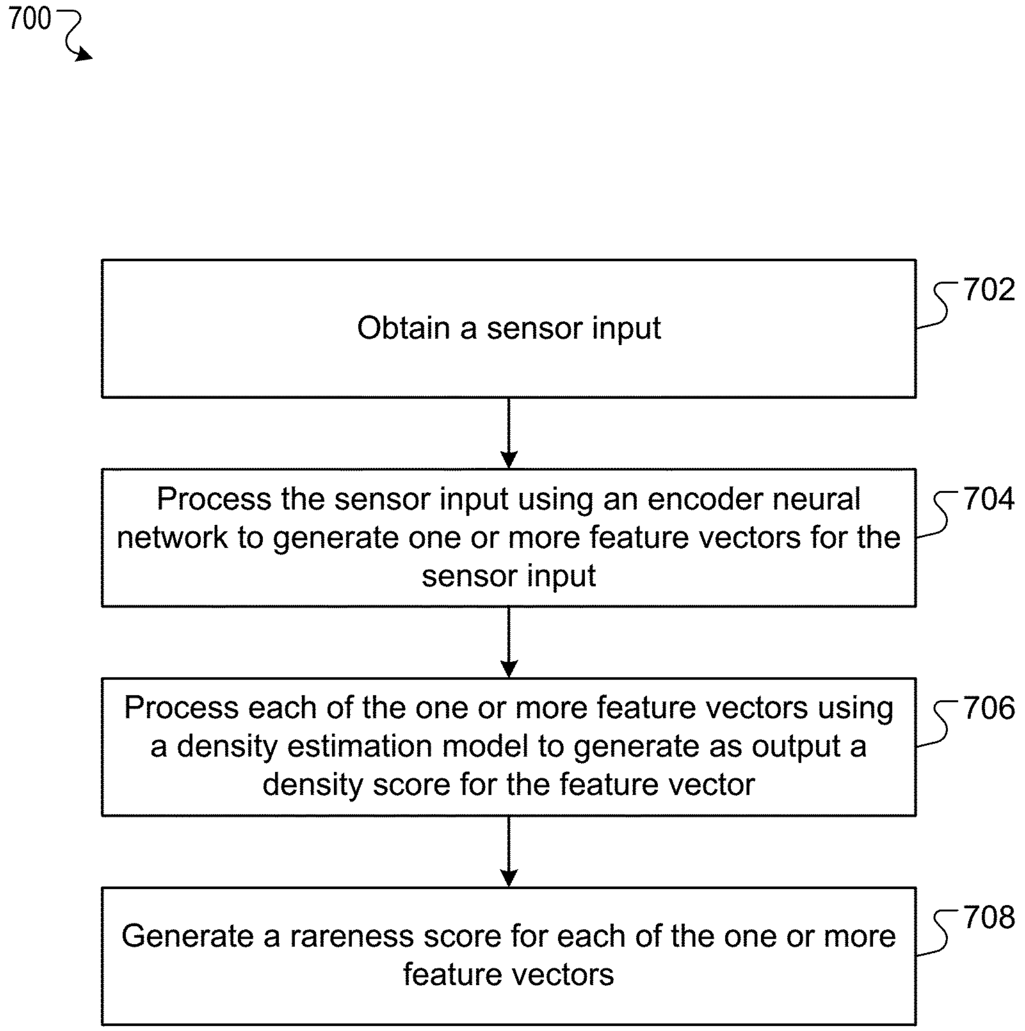
FIG. 7 is a flow diagram of an example process for generating a rareness score for a feature vector generated from a sensor input.

FIG. 7 is a flow diagram of an example process 700 for generating a rareness score for a feature vector generated from a sensor input. For convenience, the process 700 will be described as being performed by a system of one or more computers located in one or more locations. For example, a system, e.g., the rare example mining system 200 of FIG. 2, appropriately programmed in accordance with this specification, can perform the process 700.

The system obtains a sensor input (step 702). The sensor input can be generated by one or more sensors of a vehicle as it navigates through an environment. In some implementations, the sensor input can be retrieved from a data storage. The sensor input can include, e.g., a LiDAR point cloud generated by a LiDAR sensor, an image captured by camera sensor, or a fused sensor input that combines data from multiple sensors.

The system processes the sensor input using an encoder neural network to generate one or more feature vectors for the sensor input (step 704). For example, the system can generate a feature vector for a region in the sensor input, an object depicted in the region, or both. In some implementations, the encoder neural network is a neural network has been trained as part of a prediction neural network that is configured to process the sensor input to first generate an intermediate feature map, and then process the intermediate feature map to generate a prediction output for the sensor input that characterizes one or more regions of the sensor data, one or more objects depicted in the one or more regions, or both. In these implementations, the system can generate the one or more feature vectors for the sensor input from the intermediate feature map generated by the prediction neural network.

The system processes each of the one or more feature vectors using a density estimation model to generate as output a density score for the feature vector that represents an estimate of a density of the feature vector in a training set of feature vectors used to train the density estimation model (step 706). In some implementations, the density estimation model can be configured as a normalizing flow model that operates on feature vectors generated from intermediate feature maps of the prediction neural network. In these implementations, feature vectors with higher density scores can have lower rareness scores, and vice versa.

The system generates a rareness score for each of the one or more feature vectors from the density score (step 708). For example, the system can compute an additive inverse of the density score for a feature vector and use that as the rareness score for the feature vector. Thus, higher rareness scores generally reflect an increased degree of rarity.

Figure 8:
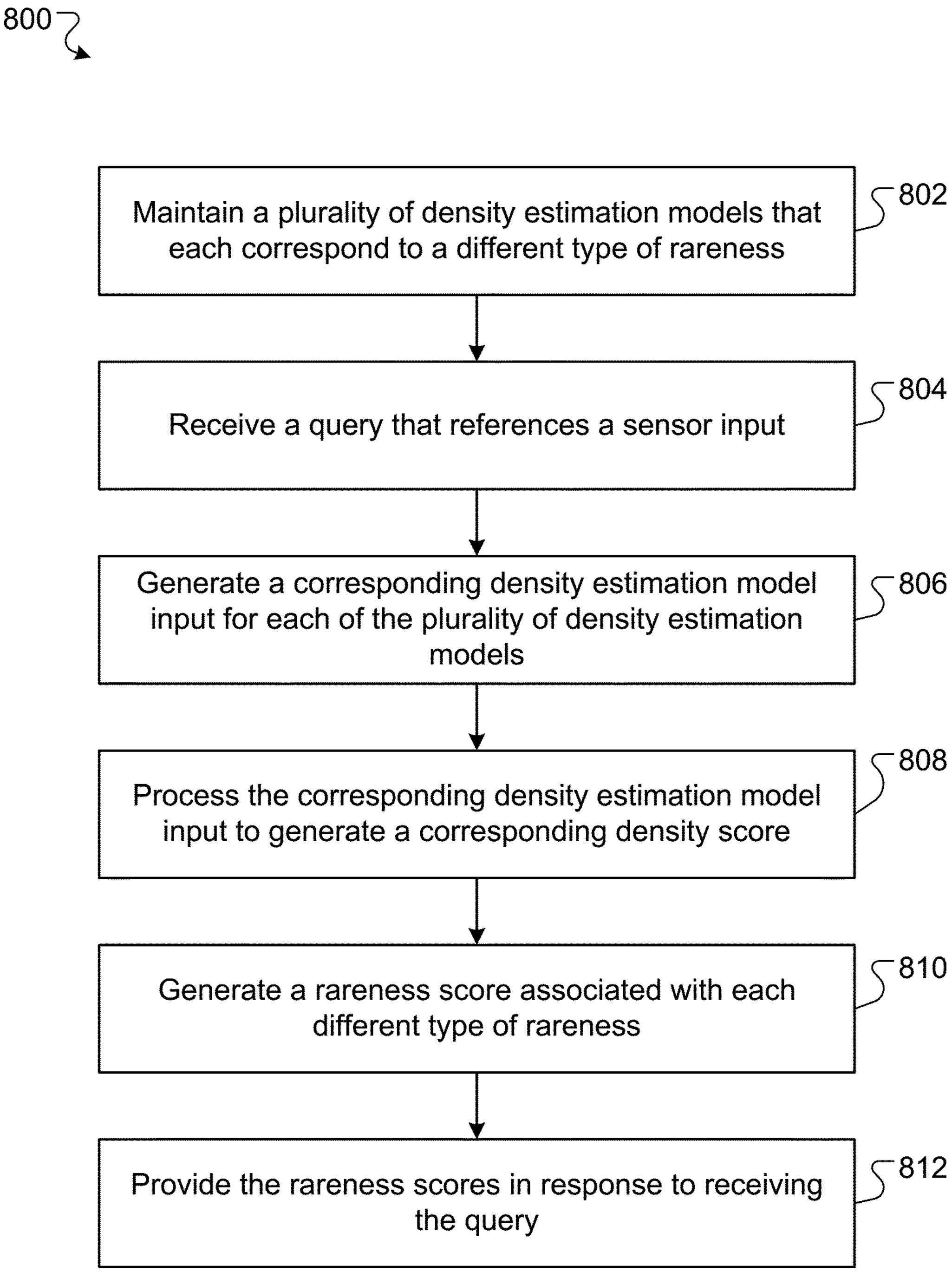
FIG. 8 is a flow diagram of an example process for providing rareness scores in response to receiving a query that references a sensor input.

FIG. 8 is a flow diagram of an example process 800 for providing rareness scores in response to receiving a query that references a sensor input. For convenience, the process 800 will be described as being performed by a system of one or more computers located in one or more locations. For example, a system, e.g., the REM query system 600 of FIG. 6, appropriately programmed in accordance with this specification, can perform the process 800.

The system maintains a plurality of density estimation models that each correspond to a different type of rareness (step 802). The system also maintains a plurality of prediction neural networks, where each prediction neural network is paired with a respective density estimation model.

A rareness of any type is defined, e.g., by a developer of the density estimation model, or another user of the system, with respect to historical sensor inputs in a driving log generated by sensors on-board a vehicle as it navigates through an environment. Each historical sensor input can include, e.g., a LiDAR point cloud generated by a LiDAR sensor, an image captured by camera sensor, or a fused sensor input that combines data from multiple sensors.

The system receives a query that references a sensor input (step 804). The system may receive such a query as a user submission through an application programming interface (API). The system may also receive such a query from another system that has access to various sensor inputs.

The system generates, from the sensor input, a corresponding density estimation model input for each of the plurality of density estimation models (step 806). Different density estimation models may process different density estimation model inputs. To generate a density estimation model input, the system can process the sensor input using a prediction neural network to generate prediction data as output of the network. An embedding generated by the prediction neural network as a result of processing the sensor input to generate the prediction data can then be used by the system to generate the density estimation model input for a density estimation model that is paired with the prediction neural network.

The system processes, using each of the plurality of density estimation models, the corresponding density estimation model input to generate a corresponding density score that represents an estimate of a density of the density estimation model input in a training set of density estimation model inputs that is used to train the density estimation model (step 808). In some implementations, the training set of density estimation model inputs can be derived from the historical sensor inputs in the driving log, e.g., by similarly using the prediction neural networks to process the historical sensor inputs and then including the embeddings generated by the prediction neural networks in the training set.

The system generates, for the sensor input, and from the density scores, a rareness score associated with each different type of rareness (step 810). For example, the system can compute an additive inverse of the density score for a feature vector and use that as the rareness score for the feature vector. Thus, higher rareness scores generally reflect an increased degree of rarity.

The system provides the rareness scores in response to receiving the query (step 812), e.g., to the user that submitted the query.

Figure 9:
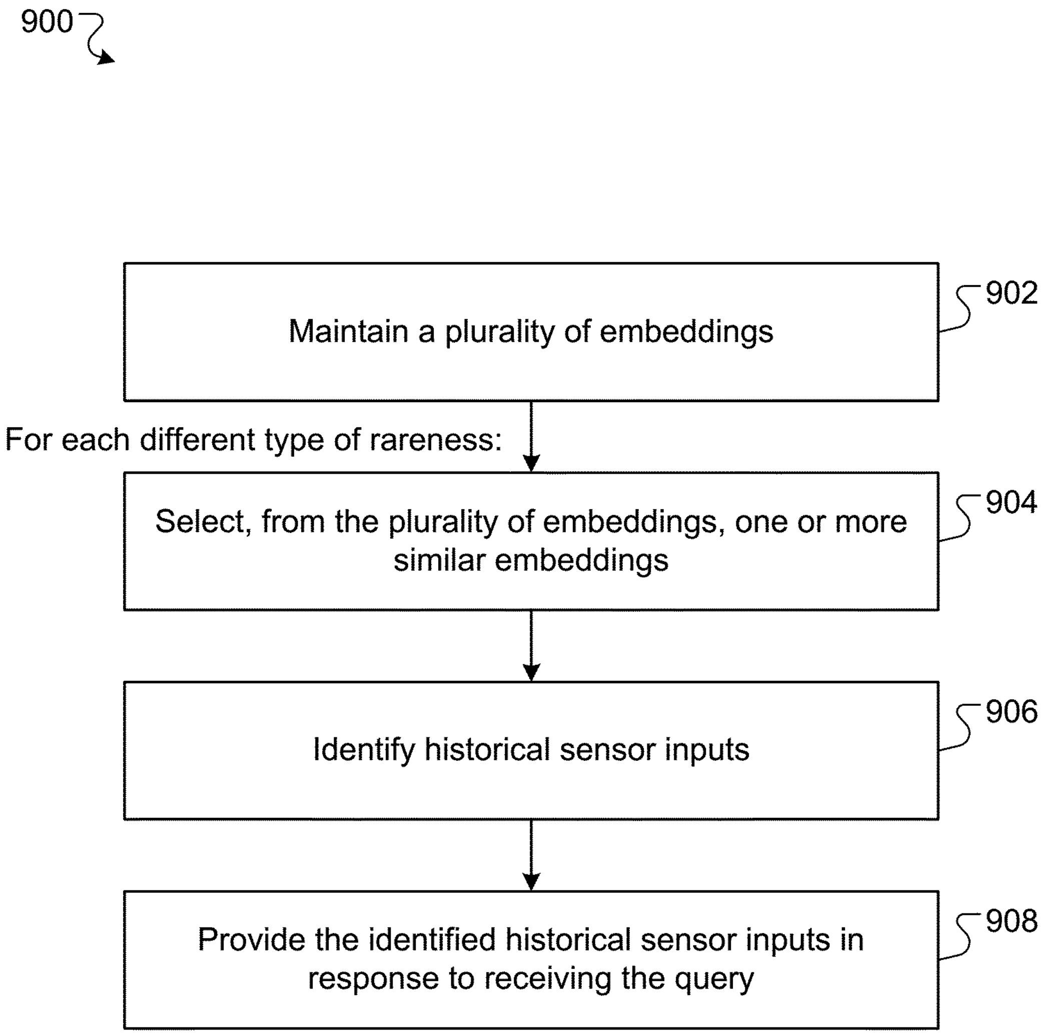
FIG. 9 is a flow diagram of an example process for providing the identified historical sensor inputs in response to receiving a query that references a sensor input.

FIG. 9 is a flow diagram of an example process 900 for providing the identified historical sensor inputs in response to receiving a query that references a sensor input. For convenience, the process 900 will be described as being performed by a system of one or more computers located in one or more locations. For example, a system, e.g., the REM query system 600 of FIG. 6, appropriately programmed in accordance with this specification, can perform the process 900.

The system maintains a plurality of embeddings that are generated by prediction neural networks that correspond respectively to the different types of rareness from processing the historical sensor inputs in the driving log (step 902).

The system can then repeat steps 904-908 for each different type of rareness.

The system selects one or more similar embeddings based on similarities of the embeddings with respect to the sensor input referenced in the query (step 904). Here, "similarity" is defined in terms of a distance in an embedding space between the query embedding and each of the plurality of embeddings maintained by the system. As described above, the query embedding is generated by a prediction neural network associated with the type of rareness, based on the sensor input. The distance may be computed in any appropriate way, such as with Euclidean distance, Hamming distance, cosine similarity, or the like.

The selection can be made by the system from a subset of the plurality of embeddings that are generated by the prediction neural network associated with the type of rareness. For example, the system can select any embedding that is closer than a threshold distance to the query embedding. As another example, the system can select a fixed number of embeddings that are most similar to the query embedding.

The system identifies similar historical sensor inputs from the driving log (step 906). A similar historical sensor input is a historical sensor input from which a corresponding prediction neural network generated a similar embedding that has been selected at step 904. In some cases, just one historical sensor input is identified for each selected similar embedding while in other cases, multiple historical sensor inputs are identified for each selected similar embedding.

In some cases, timestamp metadata that is stored in association with the historical sensor inputs can be used by the system to facilitate this identification. For example, the system can identify, for each selected similar embedding, (i) a historical sensor input generated at a given time point and (ii) one or more temporally adjacent historical sensor inputs generated as of one or more previous (or future) time points that precede (or succeed) the given time point.

Because different types of rareness may have different amounts of temporal permanence, in some cases, the system selects a different number of similar embeddings, and accordingly identifies a different number of similar historical sensor inputs, during each iteration of steps 904-908 for each different type of rareness. For example, consider an event in a driving log that spans ten time points where the target agent in the environment is driving: for the rareness of the agent's appearance it may be sufficient to select any embedding generated from an image or a LiDAR point cloud captured at one of those ten time points; but for the rareness of the agent's trajectory or behavior (rather than appearance rareness), the system may need to select one or more embeddings generated from the images or LiDAR point clouds captured across all of the ten time points or at a particular time point, e.g., at the last of the ten time points.

The system provides the identified similar historical sensor inputs in response to receiving the query, e.g., to the user that submitted the query (step 908).

Figure 10:
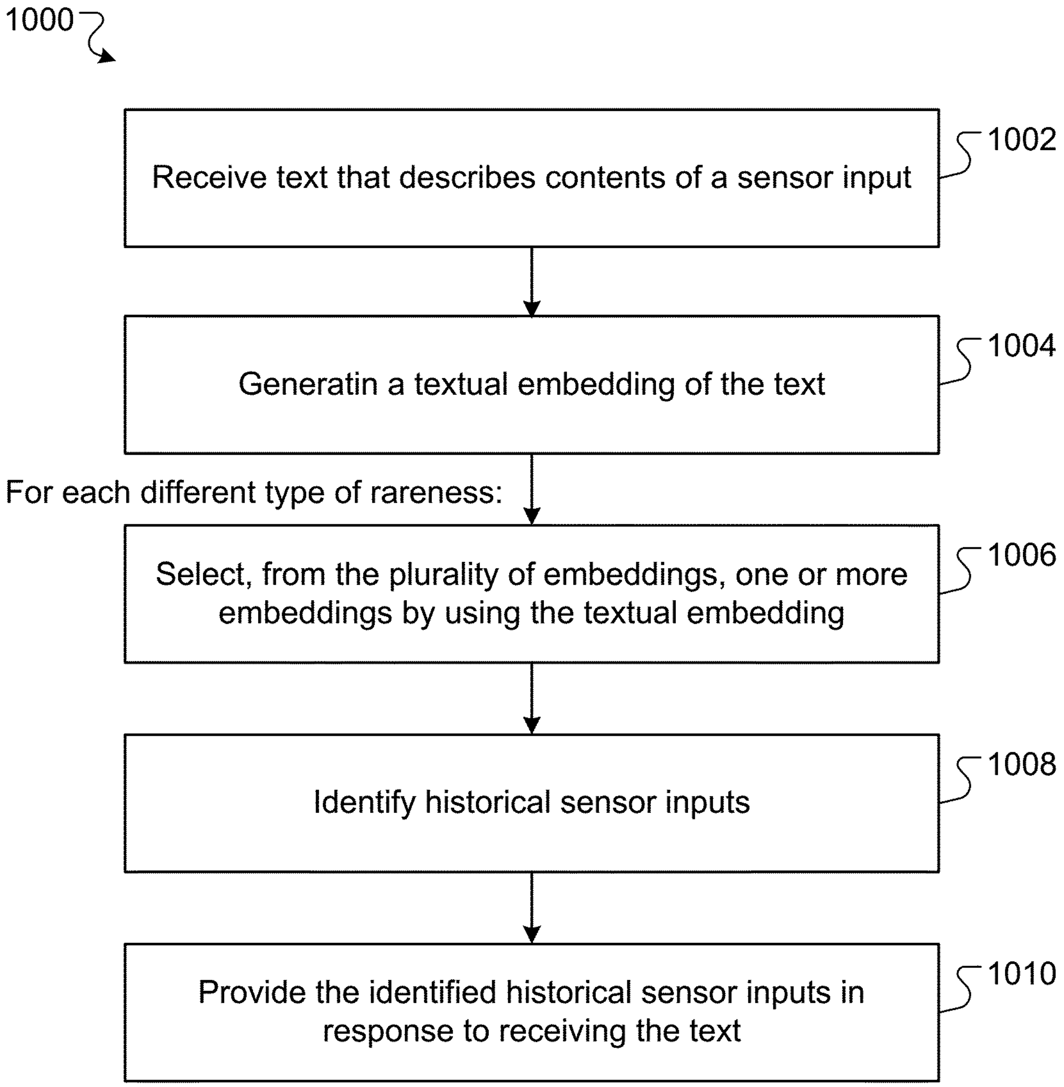
FIG. 10 is a flow diagram of an example process for providing the identified historical sensor inputs in response to receiving text that describes contents of a sensor input.

FIG. 10 is a flow diagram of an example process 1000 for providing the identified historical sensor inputs in response to receiving text that describes contents of a sensor input. For convenience, the process 1000 will be described as being performed by a system of one or more computers located in one or more locations. For example, a system, e.g., the REM query system 600 of FIG. 6, appropriately programmed in accordance with this specification, can perform the process 1000.

The system receives text that describes contents of a sensor input (step 1002). The system may receive such text as a user submission through an application programming interface (API). The system may also receive such text from another system that can generate text, e.g., that implements a textual generator model. For example, the text may be a phrase that includes one or more terms that describe a particular object type, an object having a particular appearance, an agent having a particular behavior, or the like.

The system generates a textual embedding of the text by processing the received text using a textual embedding neural network (step 1004).

The system can then repeat steps 1006-1010 for each different type of rareness.

The system selects, from the plurality of embeddings generated based on the historical sensor inputs, one or more embeddings by using the textual embedding (step 1006). Specifically, the textual embedding can be in the same embedding space, e.g., a co-embedding space that includes both textual embeddings and historical sensor input embeddings, as the embeddings generated based on the historical sensor inputs, and the system can make this selection based on similarities, i.e., in terms of a distance in the embedding space, of the textual embeddings with respect to the plurality of embeddings. That is, the system can select one or more embeddings that have been generated based on the historical sensor inputs that are similar to the textual embedding of the received text.

The system identifies retrieved historical sensor inputs from which a corresponding neural network generated the one or more embeddings (step 1008). A retrieved historical sensor input is a historical sensor input from which a corresponding prediction neural network generated an embedding that has been selected at step 1006. In some cases, just one historical sensor input is identified for each selected embedding while in other cases, multiple historical sensor input are identified for each selected embedding.

The system provides the identified retrieved historical sensor inputs in response to receiving the text, e.g., to the user that submitted the text (step 1010).

The process 1000 can be performed as part of identifying historical sensor inputs for input text for which the desired historical sensor inputs, i.e., the historical sensor inputs that includes the content that matches what is described in the input text, and thus should be identified from the plurality of embeddings by the system for the input text, are not known.

Some or all steps of the process 1000 can also be performed as part of processing input text derived from a set of training data, e.g., input text from a set of sensor input-text pairs (e.g., image-text pairs or point cloud-text pairs), where the text describes the content of the sensor input in each pair, in order to train the textual embedding neural network jointly with the prediction neural networks to determine trained values for the parameters of the neural networks.

Specifically, the system can repeatedly perform steps 1002-1004 of the process 1000 on sensor input-text pairs selected from a set of training data as part of a machine learning training technique to jointly train the textual embedding neural network and the prediction neural networks based on a gradient descent with backpropagation training technique to optimize a contrastive loss that pushes the embeddings generated from each sensor input-text pair closer together in the co-embedding space, i.e., reduces the distance between the textual embedding and the sensor input embedding generated by the textual embedding neural network and one of the prediction neural networks from the text and the sensor input in each pair, respectively, while pushing the embeddings generated from the sensor inputs and text across different pairs (e.g., within a same batch of sensor input-text pairs sampled from the set of training data) apart in the co-embedding space.

During training, the system can incorporate any number of techniques to improve the speed, the effectiveness, or both of the contrastive learning training process. For example, the system can compute the contrastive loss by evaluating a normalized softmax loss function (described in more details in Zhai, A., et al. Classification is a strong baseline for deep metric learning. In Proceedings of the British Machine Vision Conference, 2019), e.g., with label smoothing, where text and the sensor inputs from a same pair are used as positive examples while text and the sensor inputs from different pairs are used as negative examples. As another example, the system can an optimizer, e.g., LAMB (described in more details in You, Y., et al. Large batch optimization for deep learning: Training bert in 76 minutes. In Proceedings of International Conference on Learning Representations, 2020), stochastic gradient descent, or Adam optimizer, that is suitable for both textual embedding and prediction neural networks to optimize the contrastive loss.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a JAX framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by one or more computers, the method comprising:

obtaining a sensor input;

processing the sensor input using an encoder neural network to generate one or more feature vectors for the sensor input;

processing each of the one or more feature vectors using a density estimation model to generate a density score for the feature vector; and generating a rareness score for each of the one or more feature vectors from the density score, wherein the rareness score represents a degree to which a classification of an object depicted in the sensor input is rare relative to other objects.

Embodiment 2 is the method of embodiment 1, wherein the encoder neural network has been trained as part of a prediction neural network that is configured to:

process the sensor input to generate an intermediate feature map; and process the intermediate feature map to generate a prediction output for the sensor input, wherein the prediction output characterizes one or more of (i) one or more regions of the sensor data or (ii) one or more objects depicted in the one or more regions.

Embodiment 3 is the method of embodiment 2, wherein processing the sensor input using the encoder neural network to the generate one or more feature vectors for the sensor input comprises:

generating the one or more feature vectors for the sensor input from the intermediate feature map generated by the prediction neural network.

Embodiment 4 is the method of any one of embodiments 2-3, wherein the prediction output for the sensor input comprises object detection prediction data for the sensor input that specifies one or more regions of the sensor data that are each predicted to depict a respective object.

Embodiment 5 is the method of any one of embodiments 2-4, wherein the prediction output for the sensor input comprises trajectory prediction data for the sensor input that characterizes a predicted future trajectory of a target agent.

Embodiment 6 is the method of embodiment 1, further comprising:

generating, from at least the sensor input, a training data set for a downstream task, the generating comprising selecting one or more feature vectors from at least the feature vectors generated from the sensor input based on the respective rareness scores for the feature vectors;

for each selected feature vector, generating a training example that includes the sensor input from which the selected feature vector is generated and including the training example in the training data; and training a downstream neural network on the training data for the downstream task.

Embodiment 7 is the method of embodiment 6, wherein the downstream task is three-dimensional object detection task and the downstream neural network is the same neural network as the prediction neural network.

Embodiment 8 is the method of any one of embodiments 1-7, further comprising:

generating the training set of feature vectors by generating, for each sensor input in a second set of sensor data and using the object detection neural network, a respective feature vector for each of one or more regions in the sensor input that are predicted by the trained object detection neural network to depict an object; and training the density estimation model on the training set of feature vectors to maximize an expected log density score of the feature vectors in the training set.

Embodiment 9 is the method of any one of embodiments 1-8, wherein the density estimation model is a normalizing flow model.

Embodiment 10 is the method of any one of embodiments 1-9, wherein the rareness score for the feature vector is inversely proportional to the density score for the feature vector.

Embodiment 11 is the method of any one of embodiments 6-10, wherein selecting one or more feature vectors from at least the feature vectors generated from the sensor input based on the respective rareness scores comprises:

ranking respective feature vectors generated from the plurality of sensor inputs by rareness scores; and selecting a proper subset of respective feature vectors having the highest rareness scores according to the ranking.

Embodiment 12 is the method of any one of embodiments 1-11, further comprising:

generating, from the sensor input and other sensor inputs, one or more test scripts for a software module; and evaluating a performance of the software module by using the software module to process the one or more test scripts.

Embodiment 13 is a method performed by one or more computers, the method comprising:

obtaining a sensor input;

processing the sensor input using an encoder neural network to generate one or more feature vectors for the sensor input;

processing each of the one or more feature vectors using a density estimation model to generate a density score for the feature vector; and generating a rareness score for each of the one or more feature vectors from the density score, wherein the rareness score represents a degree to which a predicted behavior of an agent depicted in the sensor input is rare relative to other objects.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 13.

Embodiment 16 is a method performed by one or more computers, the method comprising:

maintaining a plurality of density estimation models that each correspond to a different rareness type with respect to historical sensor inputs in a driving log generated by sensors on-board a vehicle;

receiving a query that references a sensor input;

generating, from the sensor input, a corresponding density estimation model input for each of the plurality of density estimation models;

processing, using each of the plurality of density estimation models, the corresponding density estimation model input to generate a corresponding density score;

generating, for the sensor input, and from the density scores, a rareness score associated with each different rareness type; and providing the rareness scores in response to receiving the query.

Embodiment 17 is the method of embodiment 16, further comprising:

maintaining a plurality of embeddings that are generated by neural networks that correspond respectively to the different types of rareness from processing the historical sensor inputs in the driving log generated by sensors on-board the vehicle; and for each different type of rareness:

selecting, from the plurality of embeddings, one or more similar embeddings based on similarities of the embeddings with respect to the sensor input;

identifying historical sensor inputs from which a corresponding neural network generated the one or more similar embeddings; and providing the identified historical sensor inputs in response to receiving the query.

Embodiment 18 is the method of any one of embodiments 16-17, wherein the types of rareness comprise a first rareness type that represents a rareness in a category of an object depicted in the log of historical sensor inputs generated by sensors on-board the vehicle.

Embodiment 19 is the method of any one of embodiments 16-18, wherein the rareness types comprise a second rareness type that represents a rareness in a predicted future trajectory of a target agent characterized in the log of historical sensor inputs.

Embodiment 20 is the method of any one of embodiments 17-19, wherein maintaining the plurality of embeddings comprises:

maintaining timestamp metadata associated with log of the historical sensor inputs from which the plurality of embeddings are generated.

Embodiment 21 is the method of any one of embodiments 17-20, further comprising:

receiving text that describes contents of a sensor input;

generating a textual embedding of the text; and for each rareness type:

selecting, from the plurality of embeddings, one or more embeddings by using the textual embedding;

identifying historical sensor inputs from which a corresponding neural network generated the one or more embeddings; and providing the identified historical sensor inputs in response to receiving the text.

Embodiment 22 is a system comprising: one or more computers and one or more storage devices storing instructions that are operable, when executed by the one or more computers, to cause the one or more computers to perform the method of any one of embodiments 16 to 21.

Embodiment 23 is a computer storage medium encoded with a computer program, the program comprising instructions that are operable, when executed by data processing apparatus, to cause the data processing apparatus to perform the method of any one of embodiments 16 to 21.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

maintaining a plurality of density estimation models that each correspond to a different rareness type with respect to historical sensor inputs in a driving log generated by sensors on-board a vehicle, wherein each density estimation model is paired with a respective prediction neural network among a plurality of prediction neural networks that are trained to perform different tasks;

receiving a query that references a sensor input;

generating, for each of the plurality of density estimation models, a corresponding density estimation model input based on an embedding generated by the respective prediction neural network paired with the density estimation model, wherein the embedding comprises a set of activations generated at one or more hidden layers of the prediction neural network based on processing the sensor input;

processing, using each of the plurality of density estimation models, the corresponding density estimation model input to generate a corresponding density score that represents an estimate of a density of the density estimation model input in a training set of density estimation model inputs used to train the density estimation model;

generating, for the sensor input, and from the density scores, a rareness score associated with each different rareness type;

evaluating a performance of a software module for an autonomous vehicle by using the software module to process test inputs generated based on the rareness scores; and performing an action with respect to the software module based on a result of the evaluating.

2. The method of claim 1, further comprising:

maintaining a plurality of embeddings that are generated by the plurality of prediction neural networks from processing the historical sensor inputs in the driving log generated by sensors on-board the vehicle; and for each different type of rareness:

selecting, from the plurality of embeddings, one or more similar embeddings based on similarities of the embeddings with respect to the sensor input;

identifying historical sensor inputs from which a corresponding prediction neural network generated the one or more similar embeddings; and providing the identified historical sensor inputs in response to receiving the query.

3. The method of claim 1, wherein the types of rareness comprise a first rareness type that represents a rareness in a category of an object depicted in the log of historical sensor inputs generated by sensors on-board the vehicle.

4. The method of claim 1, wherein the rareness types comprise a second rareness type that represents a rareness in a predicted future trajectory of a target agent characterized in the log of historical sensor inputs.

5. The method of claim 2, wherein maintaining the plurality of embeddings comprises:

maintaining timestamp metadata associated with log of the historical sensor inputs from which the plurality of embeddings are generated.

6. The method of claim 2, further comprising:

receiving text that describes contents of a sensor input;

generating a textual embedding of the text; and for each rareness type:

selecting, from the plurality of embeddings, one or more embeddings by using the textual embedding;

identifying historical sensor inputs from which a corresponding prediction neural network generated the one or more embeddings; and providing the identified historical sensor inputs in response to receiving the text.

7. A system comprising: one or more computers; and one or more storage devices storing instructions that, when executed by the one or more computers, cause the one or more computers to perform operations comprising:

maintaining a plurality of density estimation models that each correspond to a different rareness type with respect to historical sensor inputs in a driving log generated by sensors on-board a vehicle, wherein each density estimation model is paired with a respective prediction neural network among a plurality of prediction neural networks that are trained to perform different tasks;

receiving a query that references a sensor input;

generating, for each of the plurality of density estimation models, a corresponding density estimation model input based on an embedding generated by the respective prediction neural network paired with the density estimation model, wherein the embedding comprises a set of activations generated at one or more hidden layers of the prediction neural network based on processing the sensor input;

processing, using each of the plurality of density estimation models, the corresponding density estimation model input to generate a corresponding density score;

generating, for the sensor input, and from the density scores, a rareness score associated with each different rareness type;

evaluating a performance of a software module for an autonomous vehicle by using the software module to process test inputs generated based on the rareness scores; and performing an action with respect to the software module based on a result of the evaluating.

8. The system of claim 7, wherein the operations further comprise:

maintaining a plurality of embeddings that are generated by the plurality of prediction neural networks from processing the historical sensor inputs in the driving log generated by sensors on-board the vehicle; and for each different type of rareness:

selecting, from the plurality of embeddings, one or more similar embeddings based on similarities of the embeddings with respect to the sensor input;

identifying historical sensor inputs from which a corresponding prediction neural network generated the one or more similar embeddings; and providing the identified historical sensor inputs in response to receiving the query.

9. The system of claim 7, wherein the types of rareness comprise a first rareness type that represents a rareness in a category of an object depicted in the log of historical sensor inputs generated by sensors on-board the vehicle.

10. The system of claim 7, wherein the rareness types comprise a second rareness type that represents a rareness in a predicted future trajectory of a target agent characterized in the log of historical sensor inputs.

11. The system of claim 8, wherein maintaining the plurality of embeddings comprises:

maintaining timestamp metadata associated with log of the historical sensor inputs from which the plurality of embeddings are generated.

12. The system of claim 8, wherein the operations further comprise:

receiving text that describes contents of a sensor input;

generating a textual embedding of the text; and for each rareness type:

selecting, from the plurality of embeddings, one or more embeddings by using the textual embedding;

identifying historical sensor inputs from which a corresponding prediction neural network generated the one or more embeddings; and providing the identified historical sensor inputs in response to receiving the text.

13. One or more non-transitory computer-readable storage media storing instructions that when executed by one or more computers cause the one or more computers to perform operations comprising:

maintaining a plurality of density estimation models that each correspond to a different rareness type with respect to historical sensor inputs in a driving log generated by sensors on-board a vehicle, wherein each density estimation model is paired with a respective prediction neural network among a plurality of prediction neural networks that are trained to perform different tasks;

receiving a query that references a sensor input;

generating, for each of the plurality of density estimation models, a corresponding density estimation model input based on an embedding generated by the respective prediction neural network paired with the density estimation model, wherein the embedding comprises a set of activations generated at one or more hidden layers of the prediction neural network based on processing the sensor input;

processing, using each of the plurality of density estimation models, the corresponding density estimation model input to generate a corresponding density score;

generating, for the sensor input, and from the density scores, a rareness score associated with each different rareness type;

evaluating a performance of a software module for an autonomous vehicle by using the software module to process test inputs generated based on the rareness scores; and performing an action with respect to the software module based on a result of the evaluating.

14. The computer-readable storage media of claim 13, wherein the operations further comprise:

maintaining a plurality of embeddings that are generated by the plurality of prediction neural networks from processing the historical sensor inputs in the driving log generated by sensors on-board the vehicle; and for each different type of rareness:

selecting, from the plurality of embeddings, one or more similar embeddings based on similarities of the embeddings with respect to the sensor input;

identifying historical sensor inputs from which a corresponding prediction neural network generated the one or more similar embeddings; and providing the identified historical sensor inputs in response to receiving the query.

15. The computer-readable storage media of claim 13, wherein the types of rareness comprise a first rareness type that represents a rareness in a category of an object depicted in the log of historical sensor inputs generated by sensors on-board the vehicle.

16. The computer-readable storage media of claim 13, wherein the rareness types comprise a second rareness type that represents a rareness in a predicted future trajectory of a target agent characterized in the log of historical sensor inputs.

17. The computer-readable storage media of claim 14, wherein maintaining the plurality of embeddings comprises:

maintaining timestamp metadata associated with log of the historical sensor inputs from which the plurality of embeddings are generated.

18. The computer-readable storage media of claim 14, wherein the operations further comprise:

receiving text that describes contents of a sensor input;

generating a textual embedding of the text; and for each rareness type:

selecting, from the plurality of embeddings, one or more embeddings by using the textual embedding;

identifying historical sensor inputs from which a corresponding prediction neural network generated the one or more embeddings; and providing the identified historical sensor inputs in response to receiving the text.

19. The method of claim 1, wherein the different tasks comprise two or more of: two-dimensional object detection, three-dimensional object detection, object classification, or trajectory prediction.

20. The system of claim 7, wherein the different tasks comprise two or more of: two-dimensional object detection, three-dimensional object detection, object classification, or trajectory prediction.

* * * * *